United States Patent
Li et al.

(10) Patent No.: US 12,434,977 B2
(45) Date of Patent: Oct. 7, 2025

(54) METHOD FOR SEPARATING AND PURIFYING PHOSPHORIC ACID AND PHOSPHOGYPSUM FROM WET-PROCESS PHOSPHORIC ACID SLURRY, AND PHOSPHORIC ACID AND PHOSPHOGYPSUM PREPARED THEREBY

(71) Applicant: Institute of Process Engineering, Chinese Academy of Sciences, Beijing (CN)

(72) Inventors: Huiquan Li, Beijing (CN); Ganyu Zhu, Beijing (CN); Ziheng Meng, Beijing (CN); Kun Yan, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/879,352

(22) PCT Filed: Oct. 11, 2023

(86) PCT No.: PCT/CN2023/123947
§ 371 (c)(1),
(2) Date: Dec. 27, 2024

(87) PCT Pub. No.: WO2024/125058
PCT Pub. Date: Jun. 20, 2024

(65) Prior Publication Data
US 2025/0162899 A1    May 22, 2025

(30) Foreign Application Priority Data
Dec. 13, 2022  (CN) .......................... 202211602036.8

(51) Int. Cl.
*C01F 11/46*    (2006.01)

(52) U.S. Cl.
CPC .................................. *C01F 11/468* (2013.01)

(58) Field of Classification Search
CPC ...... C01B 25/22; C01B 25/222; C01B 25/234; C01B 25/237; C01B 25/238; C01B 25/32; C01F 11/46; C01F 11/468; C01P 2006/80
See application file for complete search history.

(56) References Cited

U.S. PATENT DOCUMENTS

| 4,289,609 A | 9/1981 | Worthington et al. |
| 2018/0257938 A1 | 9/2018 | Hu et al. |

FOREIGN PATENT DOCUMENTS

| CN | 104768653 | 7/2015 |
| CN | 105197905 A | * 12/2015 |

(Continued)

OTHER PUBLICATIONS

Campos Assuncao et al. RSC Adv. 2017, 7, 6922 (Year: 2017).*

(Continued)

*Primary Examiner* — Alexandra M Moore
*Assistant Examiner* — Jordan W Taylor
(74) *Attorney, Agent, or Firm* — Woodard, Emhardt, Henry, Reeves & Wagner, LLP

(57) ABSTRACT

The present application provides a method for separating and purifying phosphoric acid and phosphogypsum from a wet-process phosphoric acid slurry, and phosphoric acid and phosphogypsum prepared thereby. The method is beneficial for the dissociation, precipitation and separation of colloidal silicon and carbon impurities, such that the aim of in-situ removal and rapid separation of colloidal impurities to obtain the ore slurry, from which impurities have been removed, during a reaction process for outputting phosphogypsum is realized, and a low-impurity phosphoric acid (Continued)

product and phosphogypsum product can be obtained after the ore slurry, from which impurities have been removed, has been further treated.

19 Claims, 1 Drawing Sheet

(56) References Cited

FOREIGN PATENT DOCUMENTS

| | | | | |
|---|---|---|---|---|
| CN | 112110468 A | * | 12/2020 | ............ C01F 11/182 |
| CN | 112723770 A | * | 4/2021 | |
| CN | 112875663 | | 6/2021 | |
| CN | 113353964 A | * | 9/2021 | |
| CN | 113372383 A | * | 9/2021 | |
| CN | 214917094 | | 11/2021 | |
| CN | 214917094 U | * | 11/2021 | ............... B03D 1/14 |
| CN | 114804061 | | 7/2022 | |
| CN | 114835094 | | 8/2022 | |
| CN | 114835094 A | * | 8/2022 | ........... C01B 25/223 |
| CN | 115350819 | | 11/2022 | |
| CN | 115608002 | | 1/2023 | |
| CN | 115611260 | | 1/2023 | |
| CN | 115872376 | | 3/2023 | |
| CN | 115957891 | | 4/2023 | |
| NL | 8304299 A | * | 7/1985 | ............... B03D 1/01 |

OTHER PUBLICATIONS

Li et al. CN214917094U English Machine Translation (Year: 2021).*
Santana et al.. Separation and Purification Technology 2012, 98, 402-409 (Year: 2012).*
Sheng et al. CN105197905A English Machine Translation (Year: 2018).*
Zhu et al. CN114835094A English Machine Translation (Year: 2022).*
Wang et al. CN112723770A English Machine Translation (Year: 2021).*
Van Leeuwan NL8304299A English Machine Translation (Year: 1985).*
Zhang et al. (CN113353964A English Machine Translation) (Year: 2021).*
Yang et al. (CN113372383A; English Machine Translation) (Year: 2021).*
Wang et al. (Minerals Engineering 2022, 181, 107548). (Year: 2022).*
Pourkarimi et al. Physicochem. Probl. Miner. Process. 2018, 54, (2), 278-292 (Year: 2018).*
Zhou et al. CN112110468A English (Year: 2020).*
Du et al. Sci. Rep. 2022, 12, 95 (Year: 2022).*
Liu et al. Energy Technology, 2021 (Year: 2021).*
International Search Report in related PCT/CN2023/123947 mailed Jan. 26, 2024.
Office Action in related CN202211602036.8 mailed May 1, 2024.

* cited by examiner

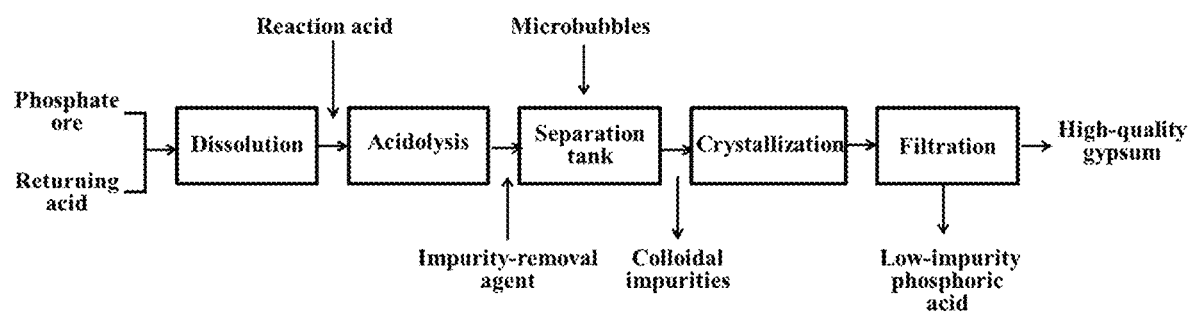

METHOD FOR SEPARATING AND PURIFYING PHOSPHORIC ACID AND PHOSPHOGYPSUM FROM WET-PROCESS PHOSPHORIC ACID SLURRY, AND PHOSPHORIC ACID AND PHOSPHOGYPSUM PREPARED THEREBY

TECHNICAL FIELD

The present application belongs to the field of purification of wet-process phosphoric acid and phosphogypsum, and in particular to a method for separating and purifying phosphoric acid and phosphogypsum from a wet-process phosphoric acid slurry, and phosphoric acid and phosphogypsum prepared therefrom.

BACKGROUND

Wet-process phosphoric acid can be used to obtain a various of phosphoric acid products, but the low-grade collophanite ore, a reaction raw material for wet-process phosphoric acid, contains lots of impurities such as colloidal silicon and carbon, and accordingly the by-product phosphogypsum of the wet-process phosphoric acid will contain lots of acid insoluble impurities of colloidal silicon and carbon and finally cannot be used directly, and these wasted phosphogypsum can only be discarded in large amounts and cause serious pollution of the environment. These phosphogypsum needs further impurity removal treatment for use. Because the impurity content in the acid phase is much higher than the national standard level, several extraction processes are usually required, and downstream processes of concentration and extraction are also needed to obtain concentrated phosphoric acid to achieve the application. The whole process of post-treatments is complex and costly.

At present, the common method for purifying the impurities of colloidal silicon and carbon in phosphogypsum is the flotation impurity-removal method. In this method, the produced phosphogypsum is required to be prepared into slurry, and the process needs to be performed under certain conditions such as specific pH value; the conditions for removing impurities are harsh, which is impossible to directly apply to the reaction process of generating phosphogypsum from wet-process phosphoric acid or effectively separate silicon and carbon impurities. Such purification not only consumes a lot of manpower, material resources, space and other costs, but also is not conducive to continuous production to reduce the production efficiency, seriously affecting the production capacity of wet-process phosphoric acid.

For example, CN202210314436.2 discloses a method of improving the whiteness and purity of phosphogypsum by a joint beneficiation-metallurgy process, which relates to the technical field of phosphogypsum treatment. Phosphogypsum produced from the wet-process phosphoric acid is classified, the products with a particle size of +120 mesh and a particle size of −500 mesh are put into the tailings storage, and the products with a particle size of −120 mesh to +500 mesh are subjected to flotation; phosphogypsum is prepared into a slurry and then added with a desilicification collecting agent and an organic matter collecting agent, and subjected to a rough flotation, and the rough concentrate is added with an adjuster and a desilicification collecting agent, mixed uniformly and then subjected to a fine flotation; the selected concentrate is purified phosphogypsum; the purified phosphogypsum is dried, added with ammonium chloride and ground, and then calcinated to obtain the whitened and purified phosphogypsum. Phosphogypsum is graded and removes a part of organic matter and silica, and then is further purified through a rough reverse flotation and a fine reverse flotation, and then added to ammonium chloride for grinding and then calcinated to obtain the phosphogypsum with higher whiteness and purity, which meets the high-value application conditions of phosphogypsum, and improves the economic benefits; however, in this solution, two types of collecting agents are used for a stepwise treatment in the process of silicon removal and organic carbon removal from the phosphogypsum, which increases the cost of treatment.

CN112723770A discloses a method for purifying by-product phosphogypsum of wet-process phosphoric acid. Firstly, the by-product phosphogypsum of phosphoric acid process is added with water and prepared into a mineral slurry, and added with a decolorizing agent according to the proportion, and overflows into the flotation tank for decolorization, and then the decolorized phosphogypsum concentrate slurry obtained is supplied with water, and pumped into the desilicification gravity separation column for jigging classification, and the silicon tailings slurry enters a belt filter for filtering to obtain silicon tailings; the top overflow concentrate slurry is pumped into an inclined plate thickener for thickening and dehydration, the bottom flow gives the phosphogypsum concentrate slurry, and then is pumped into the belt filter for filtration, and the washed filter cake is discharged in the warehouse to obtain refined phosphogypsum products. However, this solution uses a desilicification gravity separation column, has cumbersome dismantle-installing and replacing steps, and also increases the treatment cost.

Moreover, the above solutions are still post-treatment on the basis of finished phosphogypsum, which cannot achieve the in-situ removal of impurities such as colloidal silicon and carbon in phosphogypsum during the reaction process of generating phosphogypsum, and is not conducive to the efficient removing of impurities in the first place in the process of wet-process phosphoric acid.

Therefore, it is necessary to provide a new method, which achieves the effective separation of impurities during the wet-process phosphoric acid reaction process of generating phosphogypsum so as to obtain a low-impurity product, shortens the whole process flow of phosphogypsum production and treatment, and reduces the cost.

SUMMARY

The following is a brief summary of subject matter that is described in detail herein. This summary is not intended to be limiting as to the scope of the claims.

In view of the problems existing in the prior art, an object of the present application is to provide a method for separating and purifying phosphoric acid and phosphogypsum from a wet-process phosphoric acid slurry, and phosphoric acid and phosphogypsum prepared therefrom. The method comprises adding an impurity-removal agent to the wet-process phosphoric acid slurry, mixing under the action of a microbubble external field to obtain a colloidal impurity-containing organic phase and an impurity-removed mineral slurry; and then subjecting the impurity-removed mineral slurry to crystallization and solid-liquid separation in sequence to obtain the impurity-removed phosphoric acid and phosphogypsum. In the method, the impurity-removal agent and microbubble external field are coordinated, the microbubbles are used to strengthen the adhesion of impurities, and the floating upward and breaking process of microbubbles can provide energy to break large phosphogypsum particles in the slurry and make the impurity-removal agent react fully with the slurry, which is conducive to the dissociation and separation of impurities such as colloidal silicon and carbon, so as to achieve the object of in-situ removing colloidal impurities and rapidly separating to obtain the impurity-removed mineral slurry during the reaction process of phosphogypsum production, and the impurity-removed mineral slurry can be further processed to obtain a low-impurity phosphoric acid product and phosphogypsum product.

In order to achieve this object, the present application provides the following technical solutions.

In a first aspect, the present application provides a method for separating and purifying phosphoric acid and phosphogypsum from a wet-process phosphoric acid slurry, and the method comprises the following steps:

(1) adding an impurity-removal agent to a wet-process phosphoric acid slurry, mixing under the action of a microbubble external field to obtain a colloidal impurity-containing organic phase and an impurity-removed mineral slurry;

(2) subjecting the impurity-removed mineral slurry obtained in step (1) to crystallization and solid-liquid separation in sequence to obtain the impurity-removed phosphoric acid and phosphogypsum.

The object of the method provided in the present application is to achieve the in-situ separation of impurities such as colloidal silicon and carbon during the reaction process of preparing phosphogypsum from wet-process phosphoric acid. For this object, in the method, the impurity-removal agent is added to the slurry after the acidolysis reaction in the wet-process phosphoric acid process, and coupled with the microbubble external field, and microbubbles are introduced into the wet-process phosphoric acid slurry added with the impurity-removal agent by the microbubble external field, and the separation of impurities is effectively realized with the cooperation of the microbubbles and the impurity-removal agent; specifically, the impurity-removal agent itself has a desirable impurity-removal effect, and works cooperatively with the microbubbles to strengthen the adhesion of impurities, moreover, the mechanical shear force provided by the process of microbubble upward flotation and breakage causes the breakage of large phosphogypsum particles in the mineral slurry, which enhances the exposure of impurities and increases the contact area between the impurity-removal agent and the impurities, contributing to the fully reaction of impurity-removal agent and the slurry and promoting the dissociation and adhesion of impurities such as colloidal silicon and carbon. At the same time, the floating movement of microbubbles is more conducive to the upward floating separation of impurities such as colloidal silicon and carbon and organic chemicals, achieving the rapid in-situ separation between the colloidal impurities and the slurry in the reaction process. The method in the present application can be executed without the post-treatment process for phosphogypsum, which greatly shortens the process and reduces the cost, and the impurity content of the obtained phosphoric acid and phosphogypsum product is greatly reduced.

The following is an optional technical solution in the present application, but not a limitation of the technical solution provided in the present application. The technical objects and beneficial effects of the present application can be better achieved and realized by the following technical solutions.

As an optional technical solution of the present application, the impurity-removal agent in step (1) comprises a phosphate ester substance, a ketone substance, a diluent, and an organic additive having phosphorus-hydroxyl.

In one embodiment, the phosphate ester substance comprises triethyl phosphate and/or dibutyl phosphate.

In one embodiment, the ketone substance comprises aliphatic ketone containing a main chain which has less than or equal to six carbons, such as methyl isobutyl ketone.

In one embodiment, the diluent comprises any one or a combination of at least two of sulfonated kerosene, xylene, or ethyl acetate, and typical but not-limiting examples of the combination comprise a combination of sulfonated kerosene and xylene, a combination of sulfonated kerosene and ethyl acetate, or a combination of xylene and ethyl acetate.

In one embodiment, the organic additive having phosphorus-hydroxyl comprises (2-methoxyphenyl)phosphonic acid.

The structure of P=O and C=O of the impurity-removal agent in the present application will generate hydrogen bonding/van der Waals force and the like with the impurities such as colloidal silicon and carbon in the phosphogypsum, thus promoting the impurities to be adsorbed and separated from the mineral slurry; the phosphate ester substance provides a P=O functional group, which mainly generates hydrogen bonding force with a silicon hydroxyl group on the surface of the silicon impurity, and the ketone agent provides a C=O double bond, which can generate hydrogen bonding with the carbon impurity; moreover, the impurities such as colloidal silicon and carbon contain some C—O—C structures, and accordingly endowed with lipophilic properties and thus coalesce in the impurity-removal agent. The impurities such as colloidal silicon and carbon may parcel a certain amount of aluminum, iron, magnesium and other impurities, and take them away in the removal process to avoid the leaching of aluminum, iron, magnesium and other impurities into the acid liquid, thereby facilitating the enhancement of the quality of the acid liquid.

In one embodiment, in the impurity-removal agent, a volume ratio of the phosphate ester substance, the ketone substance, the diluent, and the organic additive having phosphorus-hydroxyl is (1-6):(1-6):(1-6):1, such as 1:1:2:1, 3:3:5:1, 6:6:10:1, 6:3:6:1, 2:6:6:1, 2:2:5:1, or 3:6:6:1; however, the volume ratio is not limited to the listed values, and other unlisted values within the above value range are also applicable.

In one embodiment, in step (1), a volume ratio of the wet-process phosphoric acid slurry to the impurity-removal agent is 1:(0.1-1), such as 1:0.1, 1:0.2, 1:0.3, 1:0.4, 1:0.5, 1:0.6, 1:0.7, 1:0.8, 1:0.9, or 1:1; however, the volume ratio is not limited to the listed values, and other unlisted values within the above value range are also applicable.

As an optional technical solution of the present application, in step (1), the microbubble external field is to introduce micro-nano bubbles into the wet-process phosphoric acid slurry added with an impurity-removal agent.

In one embodiment, the micro-nano bubbles have a size of 10 nm to 80 μm, such as 10 nm, 50 nm, 100 nm, 200 nm, 500 nm, 800 nm, 1 μm, 5 μm, 10 μm, 20 μm, 30 μm, 40 μm, 50 μm, 60 μm, 70 μm, or 80 μm; however, the size is not limited to the listed values, and other unlisted values within the above value range are also applicable.

In one embodiment, a ratio of the volume flow rate of the microbubbles to the flow rate of the wet-process phosphoric acid slurry added with the impurity-removal agent is 1:(5-50), such as 1:5, 1:8, 1:11, 1:14, 1:17, 1:20, 1:23, 1:26, 1:29, 1:32, 1:35, 1:38, 1:41, 1:44, 1:47, or 1:50; however, the ratio is not limited to the listed values, and other unlisted values within the above value range are also applicable.

As an optional technical solution of the present application, the mixing in step (1) is performed at a temperature of 10-100° C., such as 10° C., 20° C., 30° C., 40° C., 50° C., 60° C., 70° C., 80° C., 90° C., or 100° C.; however, the temperature is not limited to the listed values, and other unlisted values within the above value range are also applicable.

In one embodiment, the mixing in step (1) is performed for a period of 0.5-5 h, such as 0.5 h, 1 h, 1.5 h, 2 h, 2.5 h, 3 h, 3.5 h, 4 h, 4.5 h, or 5 h; however, the period is not limited to the listed values, and other unlisted values within the above value range are also applicable.

In one embodiment, the mixing in step (1) is performed under stirring at a rotational speed of 10-150 rpm, such as 10 rpm, 20 rpm, 30 rpm, 40 rpm, 50 rpm, 60 rpm, 70 rpm, 80 rpm, 90 rpm, 100 rpm, 110 rpm, 120 rpm, 130 rpm, 140 rpm, or 150 rpm; however, the rotational speed is not limited to the listed values, and other unlisted values within the above value range are also applicable.

As an optional technical solution of the present application, the preparation method for the wet-process phosphoric acid slurry in step (1) comprises: mixing phosphate ore with a returning acid solution and then dissolving, and then adding a reaction acid and performing an acidolysis reaction to obtain the wet-process phosphoric acid slurry.

As an optional technical solution of the present application, the phosphate ore has a $P_2O_5$ content of 10-40 wt %, such as 10 wt %, 15 wt %, 20 wt %, 25 wt %, 30 wt %, 35 wt %, or 40 wt %; however, the content is not limited to the listed values, and other unlisted values within the above value range are also applicable.

In one embodiment, a mass ratio of the phosphate ore to the returning acid solution is 1:(0.5-4), such as 1:0.5, 1:1, 1:1.5, 1:2, 1:2.5, 1:3, 1:3.5, or 1:4; however, the mass ratio is not limited to the listed values, and other unlisted values within the above value range are also applicable.

In one embodiment, the solute of the returning acid solution comprises sulfuric acid and/or phosphoric acid.

In one embodiment, in the returning acid solution, the sulfuric acid has a content of 1-10 wt %, such as 1 wt %, 2 wt %, 3 wt %, 4 wt %, 5 wt %, 6 wt %, 7 wt %, 8 wt %, w, or 10 wt %; the phosphoric acid has a content of 10-50 wt %, such as 10 wt %, 15 wt %, 20 wt %, 25 wt %, 30 wt %, 35 wt %, 40 wt %, 45 wt %, or 50 wt %, and the rest is water; however, the content is not limited to the listed values, and other unlisted values within the above value range are also applicable.

In one embodiment, the dissolving is performed at a temperature of 20-90° C., such as 20° C., 30° C., 40° C., 50° C., 60° C., 70° C., 80° C., or 90° C.; however, the temperature is not limited to the listed values, and other unlisted values within the above value range are also applicable.

In one embodiment, the dissolving is performed for a period of 0.5-5 h, such as 0.5 h, 1 h, 1.5 h, 2 h, 2.5 h, 3 h, 3.5 h, 4 h, 4.5 h, or 5 h; however, the period is not limited to the listed values, and other unlisted values within the above value range are also applicable.

In one embodiment, the dissolving is performed under stirring at a rotational speed of 300-800 rpm, such as 300 rpm, 350 rpm, 400 rpm, 450 rpm, 500 rpm, 550 rpm, 600 rpm, 650 rpm, 700 rpm, 750 rpm, or 800 rpm; however, the rotational speed is not limited to the listed values, and other unlisted values within the above value range are also applicable.

As an optional technical solution of the present application, the reaction acid has a solute of sulfuric acid.

In one embodiment, the solvent of the reaction acid comprises water.

In one embodiment, a solute in the reaction acid has a concentration of 30-98 wt %, such as 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 98 wt %, and the rest is water; however, the concentration is not limited to the listed values, and other unlisted values within the above value range are also applicable.

In one embodiment, a mass ratio of the solute in the reaction acid to the phosphate ore is (0.5-2.5):1, such as 0.5:1, 0.7:1, 0.9:1, 1.1:1, 1.3:1, 1.5:1, 1.7:1, 1.9:1, 2.1:1, 2.3:1, or 2.5:1; however, the mass ratio is not limited to the listed values, and other unlisted values within the above value range are also applicable.

In one embodiment, the acidolysis reaction is performed at a temperature of 60-110° C., such as 60° C., 65° C., 70° C., 75° C., 80° C., 85° C., 90° C., 95° C., 100° C., 105° C. or 110° C.; however, the temperature is not limited to the listed values, and other unlisted values within the above value range are also applicable.

In one embodiment, the acidolysis reaction is performed for a period of 3-10 h, such as 3 h, 3.5 h, 4 h, 4.5 h, 5 h, 5.5 h, 6 h, 6.5 h, 7 h, 7.5 h, 8 h, 8.5 h, 9 h, 9.5 h, or 10 h; however, the period is not limited to the listed values, and other unlisted values within the above value range are also applicable.

In one embodiment, the acidolysis reaction is performed under stirring at a rotational speed of 100-500 rpm, such as 100 rpm, 150 rpm, 200 rpm, 250 rpm, 300 rpm, 350 rpm, 400 rpm, 450 rpm, or 500 rpm; however, the rotational speed is not limited to the listed values, and other unlisted values within the above value range are also applicable.

As an optional technical solution of the present application, the crystallization in step (2) is performed at a temperature of 40-110° C., such as 40° C., 45° C., 50° C., 55° C., 60° C., 65° C., 70° C., 75° C., 80° C., 85° C., 90° C., 95° C., 100° C., 105° C., or 110° C.; however, the temperature is not limited to the listed values, and other unlisted values within the above value range are also applicable.

In one embodiment, the crystallization in step (2) is performed for a period of 1-8 h, such as 1 h, 1.5 h, 2 h, 2.5 h, 3 h, 3.5 h, 4 h, 4.5 h, 5 h, 5.5 h, 6 h, 6.5 h, 7 h, 7.5 h, or 8 h; however, the period is not limited to the listed values, and other unlisted values within the above value range are also applicable.

In one embodiment, the crystallization in step (2) is performed under stirring at a rotational speed of 50-300 rpm, such as 50 rpm, 100 rpm, 150 rpm, 200 rpm, 250 rpm, or 300 rpm; however, the rotational speed is not limited to the listed values, and other unlisted values within the above value range are also applicable.

In a second aspect, the present application provides a phosphoric acid prepared by the method according to the first aspect.

In a third aspect, the present application provides a phosphogypsum prepared by the method according to the first aspect.

Compared to existing technical solutions, the present application has at least the following beneficial effects.

In the method of the present application, the impurity-removal agent itself has a desirable impurity-removal effect, and works cooperatively with the microbubble treatment which is conducive to breaking large phosphogypsum particles so as to fully expose the impurities, contributing to the fully reaction of the impurity removal agent and the slurry and promoting the dissociation and adhesion of impurities such as colloidal silicon and carbon; at the same time, the floating movement of microbubbles is more conducive to the upward floating separation of impurities such as colloidal silicon and carbon and organic chemicals to achieve the rapid in-situ separation between the colloidal impurities and the slurry in the reaction process; the method in the present application can be executed without the post-treatment process for phosphogypsum, which greatly shortens the process and reduces the cost, and the impurity-removed mineral slurry can be further processed to obtain a low-impurity phosphoric acid product and phosphogypsum product.

Other aspects will be appreciated upon reading and understanding the accompanying drawings and detailed description.

BRIEF DESCRIPTION OF DRAWINGS

The accompanying drawings are used to provide a further understanding of the technical solutions herein, form part of the specification, and explain the technical solutions herein in conjunction with the embodiments of the present application, and do not constitute a limitation of the technical solutions herein.

FIG. 1 is a flow chart of the method for separating and purifying phosphoric acid and phosphogypsum from a wet-process phosphoric acid slurry in Example 1.

DETAILED DESCRIPTION

The technical solutions of the present application are further described below via the accompanying drawings and specific embodiments. Those skilled in the art should understand that the embodiments are only help to understand the present application and should not be regarded as a specific limitation of the present application.

Example 1

This example provides a method of separating and purifying phosphoric acid and phosphogypsum from a wet-process phosphoric acid slurry, a flow chart of which is shown in FIG. 1; as can be seen from the FIGURE, the method comprises:

Preparation of a wet-process phosphoric acid slurry: phosphate ore was mixed with a returning acid solution according to a mass ratio of 1:2, and then dissolved at 80° C. with an agitation of 300 rpm for 0.5 h to obtain the reaction slurry; wherein a content of $P_2O_5$ in the phosphorus ore was 30 wt %, and a particle size of the phosphorus ore was 100 m; in the returning acid solution, a content of sulfuric acid was 5 wt %, a content of phosphoric acid was 35 wt %, and the rest was water; then a sulfuric acid solution with a concentration of 70 wt % was mixed with the reaction slurry, a mass ratio of the sulfuric acid in the sulfuric acid solution to the phosphorus ore was controlled to be 0.5:1, and an acidolysis reaction was performed for 5 h at 80° C. with an agitation of 300 rpm to obtain a wet-process phosphoric acid slurry;

The obtained wet-process phosphoric acid slurry was used in the following steps:

(1) an impurity-removal agent was added to the wet-process phosphoric acid slurry, a volume ratio of the wet-process phosphoric acid slurry to the impurity-removal agent was controlled to be 1:0.2, and the impurity-removal agent was consisted of triethyl phosphate, methyl isobutyl ketone, sulfonated kerosene, and synthesized (2-methoxyphenyl)phosphonic acid in a volume ratio of 1:1:3:1, microbubble external field was used to introduce microbubbles with a size of 500 nm into the wet-process phosphoric acid slurry added with the impurity-removal agent to form a microbubble field throughout the slurry, a ratio of the volume flow rate of the microbubble to the flow rate of the wet-process phosphoric acid slurry added with an impurity-removal agent was controlled to be 1:30, and the slurry was treated at 80° C. with an agitation of 40 rpm for 2 h to obtain a colloidal impurity-containing organic phase and an impurity-removed mineral slurry;

(2) the impurity-removed mineral slurry in step (1) was crystallized at 85° C. with an agitation of 200 rpm for 3 h, and subjected to solid-liquid separation to obtain the impurity-removed phosphoric acid and phosphogypsum.

Example 2

This example provides a method of separating and purifying phosphoric acid and phosphogypsum from a wet-process phosphoric acid slurry, and the method comprises:

(1) an impurity-removal agent was added to the wet-process phosphoric acid slurry, a volume ratio of the wet-process phosphoric acid slurry to the impurity-removal agent was controlled to be 1:0.5, and the impurity-removal agent was consisted of dibutyl phosphate, methyl isobutyl ketone, xylene, and synthesized (2-methoxyphenyl)phosphonic acid in the volume ratio of 1:2:4:1, microbubble external field was used to introduce microbubbles with a size of 300 nm into the wet-process phosphoric acid slurry added with the impurity-removal agent to form a microbubble field throughout the slurry, a ratio of the volume flow rate of the microbubble to the flow rate of the wet-process phosphoric acid slurry added with an impurity-removal agent was controlled to be 1:50, and the slurry was treated at 50° C. with an agitation of 70 rpm for 3 h to obtain a colloidal impurity-containing organic phase and an impurity-removed mineral slurry;

in this example, a preparation of the wet-process phosphoric acid slurry is: phosphate ore was mixed with a returning acid solution according to a mass ratio of 1:1, and then dissolved at 50° C. with an agitation of 500 rpm for 1 h to obtain the reaction slurry; wherein a content of $P_2O_5$ in the phosphorus ore was 20 wt %, and a particle size of the phosphorus ore was 200 m; in the returning acid solution, a content of sulfuric acid was 5 wt %, a content of phosphoric acid was 35 wt %, and the rest was water; then a sulfuric acid solution with a concentration of 50 wt % was mixed with the reaction slurry, a mass ratio of sulfuric acid in the sulfuric acid solution to the phosphorus ore was controlled to be 1:1, and an acidolysis reaction was performed at 50° C. with an agitation of 400 rpm for 5 h to obtain the wet-process phosphoric acid slurry;

(2) the impurity-removed mineral slurry in step (1) was crystallized at 85° C. with an agitation of 200 rpm for 3 h, and subjected to solid-liquid separation to obtain the impurity-removed phosphoric acid and phosphogypsum.

Example 3

This example provides a method of separating and purifying phosphoric acid and phosphogypsum from a wet-process phosphoric acid slurry, and the method comprises:

(1) an impurity-removal agent was added to the wet-process phosphoric acid slurry, a volume ratio of the wet-process phosphoric acid slurry to the impurity-removal agent was controlled to be 1:0.5, and the impurity-removal agent was consisted of tributyl phosphate, methyl isobutyl ketone, ethyl acetate, and synthesized (2-methoxyphenyl)phosphonic acid in the volume ratio of 2:1:2:1, microbubble external field was used to introduce microbubbles with a size of 700 nm into the wet-process phosphoric acid slurry added with the impurity-removal agent to form a microbubble field throughout the slurry, a ratio of the volume flow rate of the microbubble to the flow rate of the wet-process phosphoric acid slurry added with an impurity-removal agent was controlled to be 1:5, and the slurry was treated at 30° C. with an agitation of 90 rpm for 5 h to obtain a colloidal impurity-containing organic phase and an impurity-removed mineral slurry;

in this example, a preparation method of the wet-process phosphoric acid slurry is: phosphate ore was mixed with a returning acid solution according to a mass ratio of 1:4, and then dissolved at 90° C. with an agitation of 700 rpm for 2 h to obtain the reaction slurry; wherein a content of $P_2O_5$ in the phosphorus ore was 30 wt %, and a particle size of the phosphorus ore was 600 m; in the returning acid solution, a content of sulfuric acid was 5 wt %, a content of phosphoric acid was 35 wt %, and the rest was water; and then a sulfuric acid solution with a concentration of 98 wt % was mixed with the reaction slurry, a mass ratio of sulfuric acid in the sulfuric acid solution to the phosphorus ore was controlled to be 2:1, and an acidolysis reaction was performed at 100° C. with an agitation of 200 rpm for 7 h to obtain the wet-process phosphoric acid slurry;

(2) the impurity-removed mineral slurry in step (1) was crystallized at 65° C. with an agitation of 300 rpm for 6 h, and subjected to solid-liquid separation to obtain the impurity-removed phosphoric acid and phosphogypsum.

Example 4

This example provides a method of separating and purifying phosphoric acid and phosphogypsum from a wet-process phosphoric acid slurry, and the conditions of the method were exactly the same as those of Example 1 except that in step (1), the volume ratio of the wet-process phosphoric acid slurry to the impurity-removal agent was adjusted from 1:0.2 to 1:0.05.

Example 5

This example provides a method of separating and purifying phosphoric acid and phosphogypsum from a wet-process phosphoric acid slurry, and the conditions of the method were exactly the same as those of Example 1 except that in step (1), the volume ratio of the wet-process phosphoric acid slurry to the impurity-removal agent was adjusted from 1:0.2 to 1:0.1.

Example 6

This example provides a method of separating and purifying phosphoric acid and phosphogypsum from a wet-process phosphoric acid slurry, and the conditions of the method were exactly the same as those of Example 1 except that in step (1), the volume ratio of the wet-process phosphoric acid slurry to the impurity-removal agent was adjusted from 1:0.2 to 1:0.55.

Example 7

This example provides a method of separating and purifying phosphoric acid and phosphogypsum from a wet-process phosphoric acid slurry, and the conditions of the method were exactly the same as those of Example 1 except that in step (1), the volume ratio of the wet-process phosphoric acid slurry to the impurity-removal agent was adjusted from 1:0.2 to 1:1.

Example 8

This example provides a method of separating and purifying phosphoric acid and phosphogypsum from a wet-process phosphoric acid slurry, and the conditions of the method were exactly the same as those of Example 1 except that in step (1), the volume ratio of the wet-process phosphoric acid slurry to the impurity-removal agent was adjusted from 1:0.2 to 1:1.2.

Example 9

This example provides a method of separating and purifying phosphoric acid and phosphogypsum from a wet-process phosphoric acid slurry, and the conditions of the method were exactly the same as those of Example 1 except that in step (1), the size of the microbubble was adjusted from 500 nm to 10 nm.

Example 10

This example provides a method of separating and purifying phosphoric acid and phosphogypsum from a wet-process phosphoric acid slurry, and the conditions of the method were exactly the same as those of Example 1 except that in step (1), the size of the microbubble was adjusted from 500 nm to 10 μm.

Example 11

This example provides a method of separating and purifying phosphoric acid and phosphogypsum from a wet-process phosphoric acid slurry, and the conditions of the method were exactly the same as those of Example 1 except that in step (1), the size of the microbubble was adjusted from 500 nm to 45 μm.

Example 12

This example provides a method of separating and purifying phosphoric acid and phosphogypsum from a wet-process phosphoric acid slurry, and the conditions of the method were exactly the same as those of Example 1 except that in step (1), the size of the microbubble was adjusted from 500 nm to 80 μm.

Example 13

This example provides a method of separating and purifying phosphoric acid and phosphogypsum from a wet-process phosphoric acid slurry, and the conditions of the method were exactly the same as those of Example 1 except that in step (1), the size of the microbubble was adjusted from 500 nm to 90 μm.

Example 14

This example provides a method of separating and purifying phosphoric acid and phosphogypsum from a wet-process phosphoric acid slurry, and the conditions of the method were exactly the same as those of Example 1 except that in step (2), the ratio of the volume flow rate of the microbubble to the flow rate of the wet-process phosphoric acid slurry added with the impurity-removal agent was adjusted from 1:30 to 1:5.

Example 15

This example provides a method of separating and purifying phosphoric acid and phosphogypsum from a wet-process phosphoric acid slurry, and the conditions of the method were exactly the same as those of Example 1 except that in step (2), the ratio of the volume flow rate of the microbubble to the flow rate of the wet-process phosphoric acid slurry added with the impurity-removal agent was adjusted from 1:30 to 1:15.

Example 16

This example provides a method of separating and purifying phosphoric acid and phosphogypsum from a wet-process phosphoric acid slurry, and the conditions of the method were exactly the same as those of Example 1 except that in step (2), the ratio of the volume flow rate of the microbubble to the flow rate of the wet-process phosphoric acid slurry added with the impurity-removal agent was adjusted from 1:30 to 1:50.

Example 17

This example provides a method of separating and purifying phosphoric acid and phosphogypsum from a wet-process phosphoric acid slurry, and the conditions of the method were exactly the same as those of Example 1 except that in step (2), the ratio of the volume flow rate of the microbubble to the flow rate of the wet-process phosphoric acid slurry added with the impurity-removal agent was adjusted from 1:30 to 1:53.

Example 18

This example provides a method of separating and purifying phosphoric acid and phosphogypsum from a wet-process phosphoric acid slurry, and the conditions of the method were exactly the same as those of Example 1 except that in the method, the impurity-removal agent did not contain (2-methoxyphenyl)phosphonic acid, that is, the impurity-removal agent in step (1) comprised triethyl phosphate, methyl isobutyl ketone, and sulfonated kerosene in a volume ratio of 1:1:3.

Example 19

This example provides a method of separating and purifying phosphoric acid and phosphogypsum from a wet-process phosphoric acid slurry, and the conditions of the method were exactly the same as those of Example 1 except that in the method, the impurity-removal agent did not contain methyl isobutyl ketone, that is, the impurity-removal agent in step (1) comprised triethyl phosphate, sulfonated kerosene, and synthesized (2-methoxyphenyl)phosphonic acid in a volume ratio of 1:3:1.

Example 20

This example provides a method of separating and purifying phosphoric acid and phosphogypsum from a wet-process phosphoric acid slurry, and the conditions of the method were exactly the same as those of Example 1 except that in the method, the impurity-removal agent did not contain triethyl phosphate, that is, the impurity-removal agent in step (1) comprised methyl isobutyl ketone, sulfonated kerosene, and synthesized (2-methoxyphenyl) phosphoric acid in a volume ratio of 1:3:1.

Comparative Example 1

This comparative example provides a method of separating and purifying phosphoric acid and phosphogypsum from a wet-process phosphoric acid slurry, the conditions of the method were exactly the same as those of Example 1 except that in step (1) of the method, the impurity-removal agent was not added, and the microbubble external field was directly used to introduce microbubbles into the wet-process phosphoric acid slurry.

Comparative Example 2

This comparative example provides a method of separating and purifying phosphoric acid and phosphogypsum from a wet-process phosphoric acid slurry, the conditions of the method were exactly the same as those of Example 1 except that in step (1) of the method, the microbubble external field was not used, that is, no microbubble was introduced into the wet process phosphoric acid slurry added with the impurity-removal agent, and the wet-process phosphoric acid slurry added with the impurity-removal agent was directly treated at 80° C. with an agitation of 40 rpm for 2 h to obtain a colloidal impurity-containing organic phase and an impurity-removed mineral slurry.

Comparative Example 3

This comparative example provides a method of separating and purifying phosphoric acid and phosphogypsum from a wet-process phosphoric acid slurry, the conditions of the method were exactly the same as those of Example 1 except that in step (1) of the method, the impurity-removal agent was not added, and the microbubble external field was not used, that is, no microbubble was introduced into the wet-process phosphoric acid slurry added with the impurity-removal agent, that is, the wet-process phosphoric acid slurry was directly treated at 80° C. with an agitation of 40 rpm for 2 h and then subjected to step (2).

The wet-process phosphoric acid and phosphogypsum obtained in Examples 1-20 and Comparative Examples 1-3 are subjected to characterization, and the methods are as follows.

(I) The content of impurities such as magnesium, aluminum, and iron in the phosphoric acid is measured by ICP-OES, and the ICP equipment is 5800 VDV.

(II) The phosphorus content in phosphoric acid is measured by the quimociac gravimetric method according to the national standard 'GBT2091-2008 phosphoric acid for industry use', and the specific method was as follows:

S1. preparation of test solution: about 1 g of sample was weighed out (accurate to within 0.0002 g), put in a 100 mL beaker, added with 5 mL of hydrochloric acid and 1 mL of water, covered with a watch glass, and boiled for 10 min, cooled and then transferred into a 500 mL volumetric flask, added with 10 mL of hydrochloric acid, diluted with water to the graduation for 500 mL, and shaken well;

S2. preparation of blank solution: the additive amounts of reagents were exactly the same as those in the preparation of the test solution except that no sample was added;

S3. 10 mL of the test solution and 10 mL of the blank solution were pipetted into 250 mL beakers with a pipette, respectively, added with water to a total volume of about 100 mL, and added with 35 mL of quimociac solution, covered with a watch glass, and the substance in the beaker was heated to a temperature of 75±5° C. by water bath, held for 30 s, and then cooled down to room temperature, and stirred for 3 times during the cooling process; the upper clear solution was filtered with a sintered-glass filter crucible which was dried at 180±5° C. to constant mass, the precipitate was washed for 5 times by decantation method with about 20 mL of water each time; the precipitate was transferred to a sintered-glass filter crucible and continued to be washed with water for 3 times; the sintered-glass filter crucible was placed in an electric-heating oven at 180±5° C., baked for 45 min, and then taken out, and placed in a desiccator, cooled to room temperature, and weighed (accurate to within 0.0002 g); the formula for calculating the phosphorus content in the raffinate phase is as follows:

$$\omega_2 = 221.4 \times (m_1 - m_2)/m$$

In the formula:

$\Omega_2$—phosphorus content in the raffinate phase, %;

$m_1$—mass of precipitate generated in the test solution, g;

$m_2$—mass of precipitate generated in the blank solution, g;

m—mass of the test sample, g.

(III) Calculation of MER value of phosphoric acid: the computational formula is MER=a sum of the mass fractions of magnesium oxide, aluminum oxide, and iron oxide/a mass fraction of phosphorus pentoxide.

(IV) Test of silicon content in phosphogypsum: the phosphorus content in phosphogypsum powder was quantitatively detected by XRF equipment, wherein the XRF equipment is PANalytical B.V. AXIOS, and the operating conditions were 50 KV and 60 mA.

(V) The phosphogypsum whiteness was measured by a whiteness meter, and the whiteness meter equipment was WSD-3C.

The results of the above tests are shown in Table 1.

TABLE 1

| Item | Content of magnesium, aluminum, and iron impurities in phosphoric acid (wt %) | Phosphorus content in phosphoric acid (wt %) | Phosphoric acid MER (wt %) | Silicon content in phosphogypsum (wt %) | Phosphogypsum whiteness (wt %) |
|---|---|---|---|---|---|
| Example 1 | 1.13 | 26.12 | 4.34 | 0.96 | 89.09 |
| Example 2 | 1.27 | 25.23 | 5.02 | 1.23 | 86.22 |
| Example 3 | 1.35 | 25.33 | 5.31 | 1.34 | 86.74 |
| Example 4 | 1.48 | 25.67 | 5.78 | 1.97 | 82.69 |
| Example 5 | 1.39 | 24.98 | 5.56 | 1.69 | 84.79 |
| Example 6 | 1.23 | 24.57 | 5.02 | 1.17 | 88.13 |
| Example 7 | 1.22 | 26.78 | 4.55 | 1.12 | 88.44 |
| Example 8 | 1.14 | 26.34 | 4.32 | 1.08 | 89.01 |
| Example 9 | 1.26 | 25.09 | 5.03 | 1.45 | 87.11 |
| Example 10 | 1.48 | 25.65 | 5.78 | 1.87 | 84.12 |
| Example 11 | 1.56 | 24.98 | 6.23 | 2.45 | 81.24 |
| Example 12 | 1.80 | 26.02 | 6.90 | 2.97 | 78.94 |
| Example 13 | 1.99 | 25.33 | 7.84 | 3.35 | 70.33 |
| Example 14 | 2.15 | 25.78 | 8.34 | 3.96 | 69.34 |
| Example 15 | 1.28 | 26.12 | 4.89 | 1.13 | 88.96 |
| Example 16 | 1.16 | 26.11 | 4.46 | 0.99 | 89.01 |
| Example 17 | 1.03 | 24.34 | 4.23 | 0.92 | 89.10 |
| Example 18 | 1.63 | 25.78 | 6.34 | 2.67 | 84.35 |
| Example 19 | 1.70 | 26.02 | 6.54 | 1.02 | 73.24 |
| Example 20 | 1.59 | 25.71 | 6.19 | 2.84 | 83.23 |
| Comparative Example 1 | 2.35 | 26.00 | 9.02 | 5.34 | 60.22 |
| Comparative Example 2 | 2.26 | 26.13 | 8.66 | 3.65 | 67.31 |
| Comparative Example 3 | 2.48 | 25.36 | 9.76 | 6.98 | 58.23 |

As can be seen from Table 1:

The additive amount of the impurity-removal agent is a determinative factor of the impurity-removal effect; when the additive amount is insufficient, it will lead to a low impurity-removal rate, and the overly high additive amount only leads to small improvement on impurity-removal rate, thus the agent is wasted; secondly, the size of the microbubble has a certain effect on removing impurities, and the bubble which is less than or equal to 500 nm can effectively remove the impurities, but when the bubble is too large, the effect will be poor; finally, the volume flow rate of the microbubble as well as the selection of the components in the impurity-removal agent are also closely related to the removal of impurities. Thus the control of the appropriate ratio of flow rate and the composition of the chemical agent is crucial for the removal of impurities.

The present application illustrates the detailed structural features of the present application by the above embodiments, but the present application is not limited to the above detailed structural features, that is, the present application does not necessarily rely on the above detailed structural features to be implemented. Those skilled in the art should understand that any improvements of the present application, the change or substitution which can be easily anticipated, and the selection of specific methods shall fall within the protection scope and disclosure scope of the present application.

The above describes the preferred embodiments of the present application in details. However, the present application is not limited to the specific details in the above embodiments, and various simple variations of the technical solutions of the present application can be made within the scope of the technical conception of the present application; all of these simple variations shall fall within the protection scope of the present application.

It is also to be noted that the various specific technical features described in the above specific embodiments may be combined in any suitable manners without contradiction, and in order to avoid unnecessary repetition, the various possible combinations are not described in the present application.

In addition, the various different embodiments of the present application may also be combined, and as long as they do not contradict the idea of the present application, they shall be regarded as the contents disclosed in the present application.

What is claimed is:

1. A method for separating and purifying phosphoric acid and phosphogypsum from a wet-process phosphoric acid slurry, which comprises the following steps:
   (1) adding an impurity-removal agent to the wet-process phosphoric acid slurry, mixing the same under the action of a micro-nano bubble external field to obtain a colloidal impurity-containing organic phase and an impurity-removed mineral slurry;
   (2) subjecting the impurity-removed mineral slurry obtained in step (1) to crystallization and solid-liquid separation in sequence to obtain phosphoric acid and phosphogypsum with impurities removed;
   wherein step (1) comprises:
   mixing a phosphate ore with a returning acid solution, dissolving, adding a reaction acid, and then performing an acidolysis reaction to obtain the wet-process phosphoric acid
   wherein the impurity-removal agent in step (1) is a phosphate ester substance, a ketone substance, a diluent, and an organic additive having phosphorus-hydroxyl;
   wherein in step (1), a volume ratio of the wet-process phosphoric acid slurry to the impurity-removal agent is 1:(0.2-0.9);
   and wherein in step (1), the micro-nano bubble external field is to introduce micro-nano bubbles with a size of between 10 nm to 80 μm into the wet-process phosphoric acid slurry comprising the impurity-removal agent; wherein a ratio of a volume flow rate of the micro-nano bubbles to a flow rate of the wet-process phosphoric acid slurry comprising the impurity-removal agent is 1:(15-50).

2. The method according to claim 1, wherein the phosphate ester substance comprises triethyl phosphate and/or dibutyl phosphate.

3. The method according to claim 1, wherein the ketone substance comprises an aliphatic ketone containing a main chain which has less than or equal to six carbons.

4. The method according to claim 1, wherein the diluent comprises any one or a combination of at least two of sulfonated kerosene, xylene, and er ethyl acetate.

5. The method according to claim 1, wherein the organic additive having phosphorus-hydroxyl comprises (2-methoxyphenyl)phosphoric acid.

6. The method according to claim 1, wherein in the impurity-removal agent, a volume ratio of the phosphate ester substance, the ketone substance, the diluent, and the organic additive having phosphorus-hydroxyl is (1-6):(1-6):(1-6):1.

7. The method according to claim 1, wherein the mixing in step (1) is performed at a temperature of 10-100° C.

8. The method according to claim 1, wherein the mixing in step (1) is performed for a period of 0.5-5 h.

9. The method according to claim 1, wherein the mixing in step (1) is performed under stirring at a rotational speed of 10-150 rpm.

10. The method according to claim 1, wherein the phosphate ore has a $P_2O_5$ content of 10-40 wt %.

11. The method according to claim 1, wherein a mass ratio of the phosphate ore to the returning acid solution is 1:(0.5-4).

12. The method according to claim 1, wherein a solute of the returning acid solution comprises sulfuric acid and/or phosphoric acid.

13. The method according to claim 12, wherein in the returning acid solution, the sulfuric acid has a content of 1-10 wt %, the phosphoric acid has a content of 10-50 wt %, and the rest is water.

14. The method according to claim 1, wherein the dissolving is performed at a temperature of 20-90° C.

15. The method according to claim 1, wherein the dissolving is performed for a period of 0.5-5 h.

16. The method according to claim 1, wherein the dissolving is performed under stirring at a rotational speed of 300-800 rpm.

17. The method according to claim 1, wherein the reaction acid has a solute of sulfuric acid;
   optionally, a solvent of the reaction acid comprises water;
   optionally, a solute in the reaction acid has a concentration of 30-98 wt %;
   optionally, a mass ratio of the solute in the reaction acid to the phosphate ore is (0.5-2.5):1.

18. The method according to claim 1, wherein the acidolysis reaction is performed at a temperature of 60-110° C.;
   optionally, the acidolysis reaction is performed for a period of 3-10 h;
   optionally, the acidolysis reaction is performed under stirring at a rotational speed of 100-500 rpm.

19. The method according to claim 1, wherein the crystallization in step (2) is performed at a temperature of 40-110° C.;
   optionally, the crystallization in step (2) is performed for a period of 1-8 h;
   optionally, the crystallization in step (2) is performed under stirring at a rotational speed of 50-300 rpm.

* * * * *